Aug. 26, 1969  W. F. PTAK  3,463,432
SUSPENSION CLIPS

Filed Dec. 11, 1967  2 Sheets-Sheet 1

INVENTOR.
WILBUR F. PTAK
BY
Isler & Ornstein
ATTORNEYS

Aug. 26, 1969  W. F. PTAK  3,463,432
SUSPENSION CLIPS
Filed Dec. 11, 1967  2 Sheets-Sheet 2

INVENTOR.
WILBUR F. PTAK
BY
Isler & Ornstein
ATTORNEYS

United States Patent Office 3,463,432
Patented Aug. 26, 1969

3,463,432
SUSPENSION CLIPS
Wilbur F. Ptak, Middleburg Heights, Ohio, assignor to Fastway Fasteners, Inc., Lorain, Ohio, a corporation of Ohio
Filed Dec. 11, 1967, Ser. No. 689,664
Int. Cl. E04b *1/40;* F16b *2/24*
U.S. Cl. 248—228                                      4 Claims

ABSTRACT OF THE DISCLOSURE

A suspension clip is provided which is attachable to a beam by a simple lateral movement, and has incorporated therein means for resiliently bearing against one edge of the beam for securing the clip against removal from the beam in a direction perpendicular to the general plane of the clip.

---

This invention relates generally to suspension clips, but has reference more particularly to clips of the type such as disclosed, for example, in Havener Patent 3,003,735.

Clips of the aforesaid type, used for suspending ceilings from I-beams and the like, are applied to the beams by a rotative action, so as to cause arms on the clips to snap into engagement with edges of the beams. Such clips are open to objection not only due to the fact that different size clips must be used for different sized beams, but also due to the fact that tools are sometimes required to disengage the arms from the clip, in order to remove the clip from the beam.

The present invention has as its primary object, the provision of a suspension clip, the use of which obviates the aforesaid disadvantages, enabling a single size of clip to be used for beams having base flanges of different widths, and also enabling the clip to be applied to and removed from the beam flange by a simple lateral movement and without the use of tools.

Another object of the invention is to provide a suspension clip of the character described, which is of extremely simple construction and consists of a minimum number of elements or parts, enabling the clip to be mass-produced at low cost, and therefore sold at a low price.

Other objects and advantages of my invention will be apparent during the course of the following description.

In the accompanying drawings forming a part of this specification, and in which like numerals are employed to designate like parts throughout the same, FIG. 1 is a fragmentary bottom plan view, showing a preferred form of clip embodying the invention, as applied to the flange of an I-beam;

Figure 1:
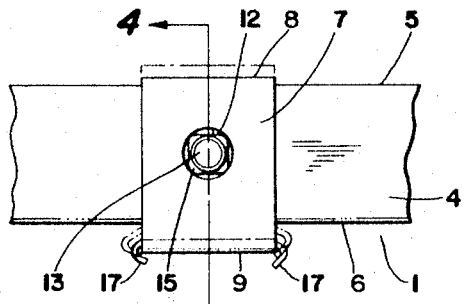

Referring more particularly to FIGS. 1 to 6 inclusive of the drawings, reference numeral 1 designates generally an I-beam, which, in this instance, is made from metal strip, bent to provide a head flange 2, a web 3, and a transverse base flange 4, the edges of which are designated by reference numerals 5 and 6.

The suspension clip is made from sheet metal, having a base or body portion 7 and upstanding edge flanges 8 and 9, the upper ends of which are rebent to provide flanges 10 and 11, respectively, which are substantially parallel with the body 7 and disposed in a common plane.

The body 7 of the clip has a central aperture 12, through which the threaded stem 13 of a stud-screw extends, the head 14 of this stud-screw resting on the upper surface of the body 7 of the clip. The screw is prevented from turning in the aperture 12 by means of an anchor washer 15, which surrounds and is anchored to the stem 13, is disposed within the aperture 12, and has corners which rigidly engage the inner wall of the aperture.

It is to be noted that the distance between the flanges 8 and 9 of the clip is substantially greater than the width of the flange 4 of the beam 1, and that the width of the flange 11 is substantially greater than the width of the flange 10. The reasons for this are apparent from FIG. 4 of the drawings, wherein the clip is shown as applied to the flange 4 of the beam, and the overhang of the flanges 10 and 11 on the flange is substantially equal, and to an extent sufficient to prevent removal of the clip from the beam by a movement in the direction of the axis of the stem 13 of the stud-screw.

The clip further includes as a necessary component thereof, an arched member 16 of spring steel, which lies in the space between the body 7 and the flange 11 of the clip, and is provided with hook-like ends 17, which extends around the ends of the flange 9 to thereby prevent disengagement of the member 16 from the flange 9.

Figure 6:
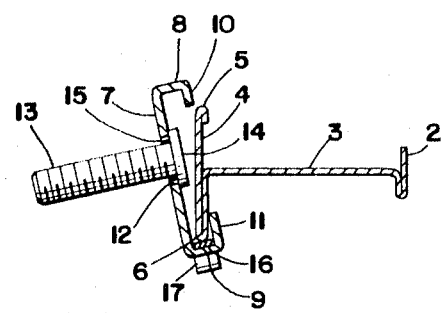
FIG. 6 is a view similar to FIG. 4, but showing how the clip is applied to or disengaged from the base flange of the I-beam.

In order to secure the clip to the flange 4 of the beam 1 in the manner shown in FIGS. 1 to 5 inclusive, the clip is disposed at a slight angle to the flange 4, in the manner shown in FIG. 6, and the edge 6 of the flange 4 is then brought to bear on the spring member 16, sufficient pressure being exerted on the member 16 to substantially flatten it, as shown in FIG. 6. At this point, the inboard edge of the flange 10 of the clip is, as shown in FIG. 6, at a position at which it can just clear the edge 5 of the flange 4, when the body 7 of the clip is moved toward the right and into parallelism with the flange 4.

Figure 4:
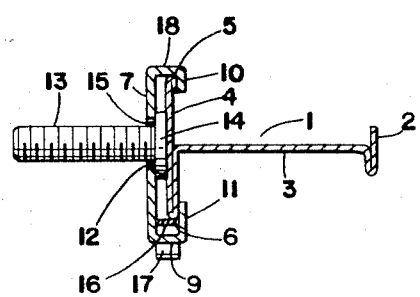
FIG. 4 is a cross-sectional view, taken on the line 4—4 of FIG. 1.
Figure 2:
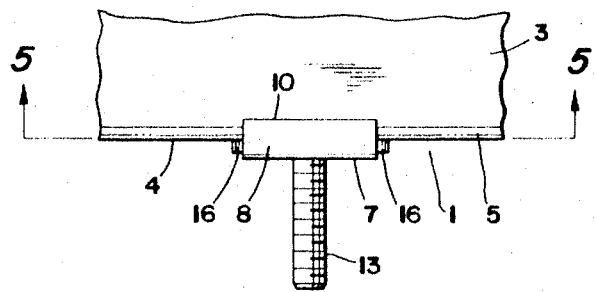
FIG. 2 is an elevational view of one side of the clip shown in FIG. 1, and more particularly, as viewed from the top of FIG. 1.
Figure 5:
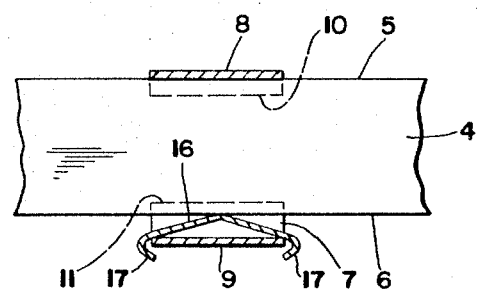
FIG. 5 is a cross-sectional view, taken on the line 5—5 of FIG. 2.
Figure 3:
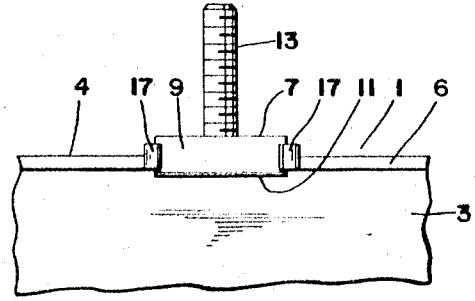
FIG. 3 is an elevational view of the other side of the clip shown in FIG. 1, and more particularly, as viewed from the bottom of FIG. 1.

The pressure on the spring member 16 is then released, as a result of which, the member 16 resumes its arched condition (see FIG. 5), exerting pressure against the edge 6, and the clip assumes the position in relation to the flange 4, which is shown in FIG. 4.

The clip may be removed from the flange 4 of the beam by a reversal of the procedure just described.

It may also be noted that, as seen in FIG. 4, the head 14 of the stud-screw substantially fills the space between the body 7 of the clip and the flange 4 of the beam, thereby preventing movement of the clip toward the beam in the direction of the axis of the stem 13 of the screw. This provides stability between the clip and beam, after assembly, but does not interfere with removal of the clip from the beam when this becomes necessary.

The spring member 16 is so designed that it can exert pressure on the edge 6 of the flange 4, even with slight variations in the width of the flange 4. This enables the clip to be used for beams having base flanges of different widths or dimensions.

It is also seen that I have provided a suspension clip which can be applied to and removed from a beam flange by a simple lateral movement and without the use of tools.

It is further seen that I have provided a suspension clip which is of extremely simple construction, and consists of a minimum number of parts, enabling the clip to be mass-produced at low cost, and sold at a low price.

Figure 7:
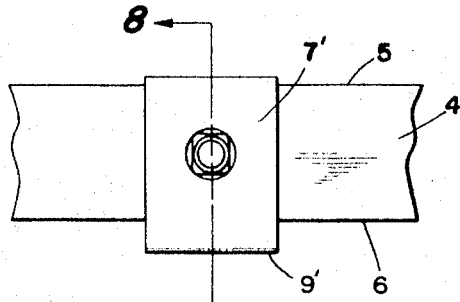
FIG. 7 is a view similar to FIG. 1, but of a modified form of the invention.
Figure 8:
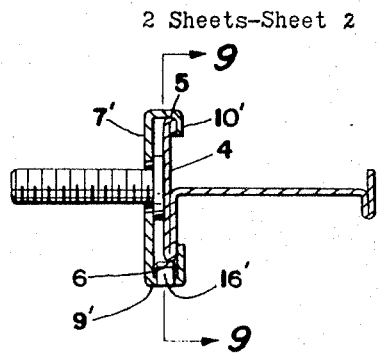
FIG. 8 is a cross-sectional view, taken on the line 8—8 of FIG. 7.
Figure 9:
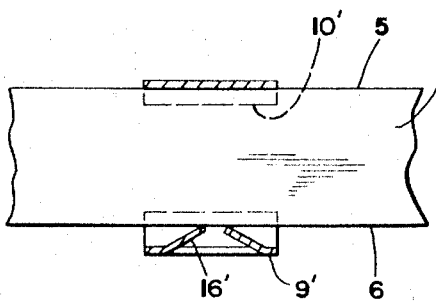
FIG. 9 is a cross-sectional view, taken on the line 9—9 of FIG. 7.

In FIGS. 7, 8 and 9, a modification of the invention is shown, in which the clip is of substantially the same construction as in FIGS. 1 to 6 inclusive, but in which, instead of using a separate spring member, such as the member 16, the flange 9' of the clip (corresponding to the flange 9 of the clip in FIG. 4), is slit, as shown in FIGS. 8 and 9, to provide arms 16', which are bent upwardly as shown in these figures, and heat-treated to impart a resiliency thereto, which enables these arms to exert pressure against the edge 6 of the flange 4, and also to be flattened downwardly by pressure of the edge 6 on these arms until they are substantially parallel with the flange 9'.

In order to secure this clip to the flange 4 of the beam, in the manner shown in FIGS. 7, 8 and 9, the clip is disposed at an angle to the flange 4 in a manner such as shown in FIG. 6, and the edge 6 of the flange 4 is then brought to bear on the spring arms 16', sufficient pressure being exerted on these spring arms to bring them substantially into a common plane with the flange 9'. At this point, the inboard edge of the flange 10' of the clip is at a position corresponding to the position shown in FIG. 6, that is to say, at a position at which it can just clear the edge 5 of the flange 4, when the body 7' of the clip is moved toward and into parallelism with the flange 4.

The pressure on the spring arms 16' is then released, as a result of which the arms 16' resume the position shown in FIG. 9, exerting pressure against the edge 6, and the clip assumes the position in relation to the flange 4, which is shown in FIG. 8.

Figure 10:
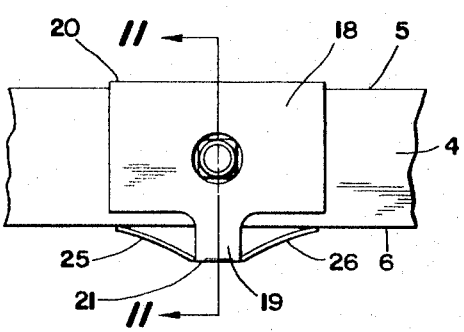
FIG. 10 is a view similar to FIGS. 1 and 7, but showing another modified form of the invention.
Figure 11:
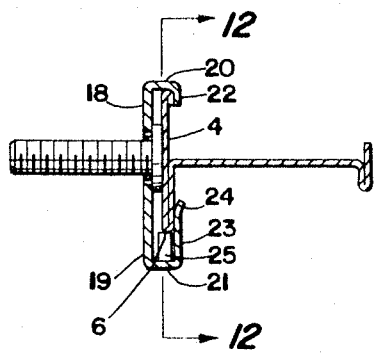
FIG. 11 is a cross-sectional view, taken on the line 11—11 of FIG. 10.
Figure 12:
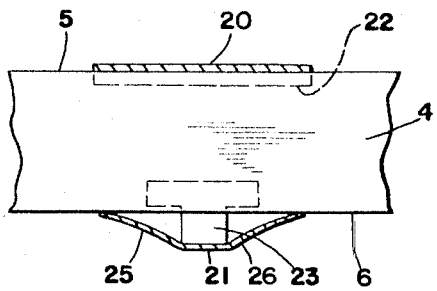
FIG. 12 is a cross-sectional view, taken on the line 12—12 of FIG. 11.

In FIGS. 10, 11 and 12, another modification of the invention is shown, which may be described as follows:

The suspension clip, in this instance, is made from sheet metal having a base or body consisting of a rectangular portion 18 and a tongue-like portion 19 extending from the center of one side of the portion 18.

The base or body 18–19 has upstanding edge flanges 20 and 21, the upper ends of which are rebent to provide flanges 22 and 23 respectively, which are substantially parallel with the body 18–19 and disposed in a common plane. The flange 23, however, is, as shown in FIG. 12, of T-shaped conformation, and, as shown at 24 in FIG. 11, is flared outwardly at its inboard edge, so as to facilitate entry of the edge 6 of the flange 4 into the space between the body 18–19 and the flange 23.

Extending from the ends of the flange 21 of the clip are spring arms 25 and 26, which extend toward and bear resiliently against the edge 6 of the beam.

In order to secure the clip to the flange 4 of the beam in the manner shown in FIGS. 10, 11 and 12, the clip is disposed at a slight angle to the flange 4, in the manner shown in FIG. 6, and the edge 6 of the flange 4 is then brought to bear on the spring arms 25 and 26, sufficient pressure being exerted on these spring arms to flatten them to an extent such that the inboard edge of the flange 22 of the clip is at a position at which it can just clear the edge 5 of the flange 4, when the body 18–19 of the clip is moved toward and into parallelism with the flange 4.

The pressure on the arms 25 and 26 is then released, as a result of which, the arms 25 and 26 resume the position shown in FIG. 12, exerting pressure against the edge 6, and the clip assumes the position in relation to the flange 4, which is shown in FIG. 11.

It is to be understood that the forms of my invention, herewith shown and described, are to be taken as preferred examples of the same, and that various changes may be made in the shape, size and arrangement of parts thereof, without departing from the spirit of the invention or the scope of the subjoined claims.

Having thus described my invention, I claim:

1. In combination with a beam having a base flange, a suspension clip comprised of a rigid body portion having a width greater than the edge-to-edge width of said base flange, a pair of facing re-entrant grooves one of said grooves being deeper than the other and both defining the marginal edges of said body and formed with terminal edges overlying said body and spaced apart a distance less than the lateral edge-to-edge width of the base flange; resilient means associated with at least one of said re-entrant grooves and bearing against at least one edge of the base flange to exert a biasing component toward the opposite of said re-entrant grooves whereby said clip may be installed at any point on said flange by engagement of the deeper re-entrant groove and compression of said resilient means followed by engagement of the base of the clip with the bottom of the beam and release of said clip so that it is retained in position on said base flange by confinement of the edge portions of said base flange within said re-entrant grooves, pendant means located generally centrally of and attached to the body portion of said suspension clip for supporting a structural member therefrom.

2. The combination, as recited in claim 1, wherein said pendant means comprises a bolt extending through an aperture in the body portion of said suspension clip.

3. The combination as recited in claim 1 wherein said resilient means comprises a spring member independent of said clip, but secured to said clip and having an intermediate portion which lies within said re-entrant groove and bears against the edge of said flange.

4. The combination as recited in claim 1 wherein said resilient means comprises spring arms formed integrally with the clip and extending toward said edge of said beam flange.

References Cited

UNITED STATES PATENTS

| 712,140 | 11/1902 | Keeley | 24—10.1 |
| 770,953 | 9/1904 | Bell | 24—10.1 |
| 1,997,580 | 4/1935 | Gibson | 52—489 X |
| 499,549 | 6/1893 | Hunter et al. | 248—72 |
| 1,638,668 | 8/1927 | Volk | 52—463 |
| 2,683,946 | 7/1954 | Olson | 235—70 |
| 3,276,684 | 10/1966 | Ritchie | 235—70 |

OTHER REFERENCES

German printed application 1,204,801, published Nov. 11, 1965 to G.HA.

JOHN E. MURTAGH, Primary Examiner

U.S. Cl. X.R.

24—259; 52—489; 248—300